(12) United States Patent
Tan et al.

(10) Patent No.: US 7,544,945 B2
(45) Date of Patent: Jun. 9, 2009

(54) VERTICAL CAVITY SURFACE EMITTING LASER (VCSEL) ARRAY LASER SCANNER

(75) Inventors: Michael R. T. Tan, Menlo Park, CA (US); William R. Trutna, Jr., Atherton, CA (US); Georgios Panotopoulos, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 231 days.

(21) Appl. No.: 11/347,954

(22) Filed: Feb. 6, 2006

(65) Prior Publication Data

US 2007/0181810 A1    Aug. 9, 2007

(51) Int. Cl.
   *G01J 5/02*    (2006.01)
(52) U.S. Cl. .................... 250/341.1; 250/353; 180/169; 342/54
(58) Field of Classification Search ............. 250/341.1; 180/169; 342/54
   See application file for complete search history.

(56) References Cited

U.S. PATENT DOCUMENTS

| 5,552,893 | A | 9/1996 | Akasu | |
|---|---|---|---|---|
| 6,061,001 | A * | 5/2000 | Sugimoto | .................... 340/903 |
| 6,654,401 | B2 * | 11/2003 | Cavalheiro Vieira et al. | .. 372/70 |
| 6,680,788 | B1 | 1/2004 | Roberson et al. | |
| 6,700,529 | B2 | 3/2004 | Matsuura | |
| 6,810,330 | B2 | 10/2004 | Matsuura | |
| 6,819,407 | B2 | 11/2004 | Arita et al. | |
| 6,831,591 | B2 | 12/2004 | Horibe | |
| 2002/0117340 | A1* | 8/2002 | Stettner | ....................... 180/169 |
| 2004/0118624 | A1* | 6/2004 | Beuhler et al. | ............... 180/167 |
| 2004/0150514 | A1 | 8/2004 | Newman et al. | |
| 2004/0175183 | A1 | 9/2004 | Willhoeft et al. | |
| 2004/0239509 | A1 | 12/2004 | Kisacanin et al. | |
| 2005/0195383 | A1* | 9/2005 | Breed et al. | ................. 356/4.01 |
| 2006/0132752 | A1* | 6/2006 | Kane | ......................... 356/5.02 |

FOREIGN PATENT DOCUMENTS

DE    102004014041    10/2005

OTHER PUBLICATIONS

Glenn R. Widmann, et al., Comparison of Lidar-Based and Radar-Based Adaptive Cruise Control System,: SAE Technical Paper Series (200-01-0345); SAE International, SAE 2000 World Congress; Detroit, Michigan; Mar. 6-9, 2000; pp. 1-14.*

(Continued)

*Primary Examiner*—David Porta
*Assistant Examiner*—Jessica L Eley

(57) ABSTRACT

Vehicle-based lidar systems and methods are disclosed using multiple lasers to provide more compact and cost-effective lidar functionality. Each laser in an array of lasers can be sequentially activated so that a corresponding optical element mounted with respect to the array of lasers produces respective interrogation beams in substantially different directions. Light from these beams is reflected by objects in a vehicle's environment, and detected so as to provide information about the objects to vehicle operators and/or passengers.

18 Claims, 3 Drawing Sheets

OTHER PUBLICATIONS

Glenn R. Widmann, et al., "Comparison of Lidar-Based and Radar-Based Adaptive Cruise Control Systems," SAE Technical Paper Series (2001-01-0345); SAE International, SAE 2000 World Congress; Detroit, Michigan; Mar. 6-9, 2000; pp. 1-14.

Glenn R. Widmann, et al., "Development of Collision Avoidance Systems at Delphi Automotive Systems," 1998 IEEE International Conference on Intelligent Vehicles, pp. 353-358.

"Laser Sensor Technologies for Preventive Safety Functions," Laser Sensor Technologies for Preventive Safety Functions; ATA EL 2004; Parmy, Italy; IBEO Automobiel Sensor GmbH; Ulrich Lages, pp. 1-16.

LaserFocusWorld, "Automakers Turn to Optoelectronics for Safety," Oct. 1, 2001; 2 pages; <http://laserfocusworld.printthis.clickability.com>.

Xu Wang et al., "Liquid-Crystal Blazed-Grating Beam Deflector," Applied Optics, Dec. 10, 2000; vol. 39, No. 35, pp. 6545-6555.

William D. Jones, "Keeping Cars," Adaptive Cruise Control Is Here, The First Step Toward Systems That Can Help Cars Keep Their Distance On Crowded Highways, IEEE Spectrum, Sep. 2001, pp. 40-45.

* cited by examiner

350   *FIG. 5B*

VERTICAL CAVITY SURFACE EMITTING LASER (VCSEL) ARRAY LASER SCANNER

BACKGROUND

Numerous devices and techniques have been used to improve the safety of vehicle operation, both for vehicle operators/passengers and those in the environment around a vehicle. Additionally, devices and techniques are also employed to reduce or eliminate the likelihood of damage to a vehicle and objects in a vehicle's environment during vehicle operation. Many of these devices and techniques focus on providing a vehicle operator with information about potential hazards so that the operator has ample time to take corrective measures. For example, many automobile manufactures equip vehicles with single or multiple beam radar back-up warning devices. These devices are designed to assist a driver in detecting animals, people, vehicles, and other objects when backing the vehicle. Radar has also been used in many experimental forward-looking obstacle detection and collision avoidance systems. Other areas of obstacle detection/avoidance research and development include ultrasonic systems, video systems, and lidar (light detection and ranging) systems.

In any of these systems, it is desirable for such systems to employ sensing techniques for object detection and tracking that have relatively high resolution for obstacle localization, precise tracking capabilities, and reliability under many different driving conditions. Lidar based systems have some advantages such as precise distance measurement, high angular resolution, low latency, and relatively low system complexity.

Lidar systems currently developed for vehicle-based object tracking/avoidance systems typically deploy a pulsed (or suitably shuttered continuous wave) laser beam that is scanned in the direction of interrogation using a moving mirror, such as a rotating single-facet or multi-facet (e.g., polygonal) mirror. The laser beam is reflected from an obstacle and detected with a photodetector. The time-of-flight of the laser pulse, i.e., the time delay between the transmitted pulse and the received pulse, determines the object distance. The object's bearing is further determined based on the mirror's angular position at the time of the transmitted pulse.

Such lidar systems offer a degree of simplicity in their design, but their implementation presents certain disadvantages. Chief among these disadvantages is the presence of a moving mirror that is typically rotated at a rate of tens or hundreds of revolutions per minute. These rotating mirrors and corresponding motors add size and weight to the device, the motors can require significant power, and the presence of moving parts can increase the likelihood of device failure through mechanical wear. These are all disadvantages in general, and particularly so in the context of vehicle deployment. Vehicles are expected to operate in environments and manners that can be harsh for devices that include high-speed rotating mirrors, e.g., operation on course roads, rapid acceleration/deceleration, etc. Moreover, for many vehicles, particularly automobiles, it is desirable to locate lidar devices in perimeter positions that consume as little space as possible and are otherwise unobtrusive, e.g., behind an engine grill, integrated into a headlight or taillight assembly, or integrated into some portion of a bumper.

SUMMARY

In accordance with the invention, vehicle-based lidar systems and methods are disclosed using multiple lasers to provide more compact and cost-effective lidar functionality. Each laser in an array of lasers can be sequentially activated so that a corresponding optical element mounted with respect to the array of lasers produces respective interrogation beams in substantially different directions. Light from these beams is reflected by objects in a vehicle's environment, and detected so as to provide information about the objects to vehicle operators and/or passengers.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

FIGS. 5A-5B illustrate further examples of laser and optics systems in accordance with the invention for use in lidar systems and particularly vehicle based lidar systems.

DETAILED DESCRIPTION

The following sets forth a detailed description of the best contemplated mode for carrying out the invention. The description is intended to be illustrative of the invention and should not be taken to be limiting.

Throughout this application, reference will be made to various vehicle based implementations of lidar systems. In general, these lidar systems can be used with any type of vehicle, although the examples of the present application will emphasize automobile applications for various safety systems such as: collision avoidance systems, pedestrian detection systems, adaptive cruise control, blind spot monitoring systems, lane-change assist systems, automatic emergency braking systems, lane/road departure systems, and the like. Additionally, although the laser scanning and photodetection devices and techniques disclosed in accordance with the invention emphasize vehicle applications, they can also be used in numerous other fields and need not be limited to vehicle lidar applications.

Figure 1:
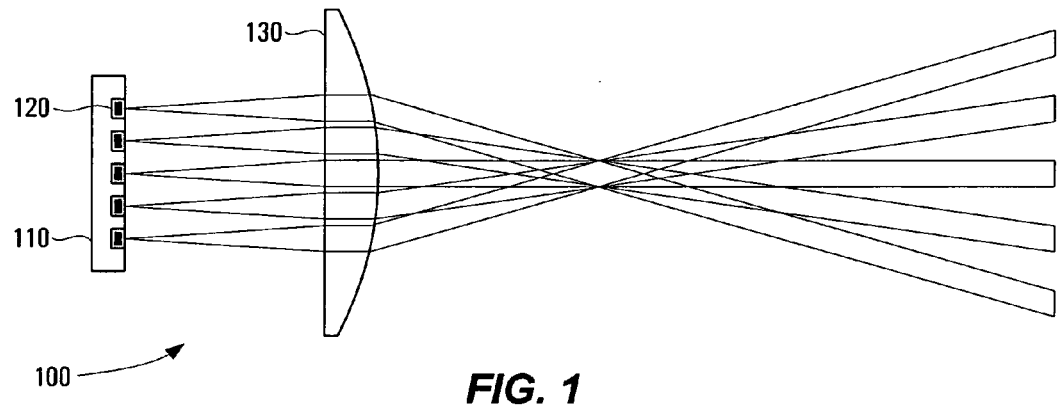
FIG. 1 illustrates a laser and optics system, in accordance with the invention, for use in lidar systems and particularly vehicle based lidar systems.

FIG. 1 illustrates a laser and optics system 100, in accordance with the invention, for use in lidar systems and particularly vehicle based lidar systems. System 100 includes semiconductor laser array 110 (having a plurality of individually addressable/activated semiconductor lasers 120) and a suitable lens or other optics system 130. System 100 is operated in a manner so that it can replace lidar laser systems that employ mechanically rotated or translated reflective optics. More specifically, each semiconductor laser 120 can be designed to have a relatively low angle of divergence (e.g., NA<0.1). Laser array 110 is located with respect to lens 130 such that the semiconductor laser elements are approximately one focal length away from the lens. Thus, when any one semiconductor laser 120 is activated, it produces a substantially collimated beam of light whose angular direction is determined by the position of the active laser within the array. Using a relatively high NA lens (e.g., 0.5) multiple resolvable spots can be produced. In general, the angular extent of the illumination is determined by a number of factors including: the degree of divergence of the initial laser beam, the f# or NA of the lens, and any other special attributes of the lens.

By sequentially activating each semiconductor laser individually, system 100 can be used to scan the laser beam over the field of view of lens 130. One or more photodetectors (as will be described in greater detail below) can be placed in proximity to laser array 110 to collect the light from an activated laser that is reflected by objects illuminated by the laser beam. Angular information, e.g., the bearing of the detected object, is determined by knowing which semiconductor laser in the array has been activated. Lenses can also be integrated with or associated with the photodetectors to improve detection efficiency and increase the detected signal level. Similarly, lenses used with the photodetectors can be designed to improve angular information from the return signal.

In many embodiments in accordance with the invention, only one semiconductor laser from an array is activated at any one time. Since an object reflecting light from the semiconductor laser may not do so uniformly, e.g., light is scattered in many directions, light absorption by the object varies across the surface of the object because of differences in the object's surface, atmospheric absorption and scattering, etc., using only one laser at a time ensures that the photodetector is collecting light from a single one of the array lasers, and thus is interrogating a single direction or sector of the device's overall field of view. In still other embodiments in accordance with the invention, multiple lasers can be in use at the same time, and other techniques are used to distinguish the received reflections. Such techniques can include, for example, using different wavelength semiconductor lasers, encoding the laser pulses in different ways (e.g., pulse encoding, phase encoding, etc), careful collection of reflected light segregated by interrogation angle, and the like.

Since object detection is based on time of flight analysis of laser pulses, the maximum range of analyzed objects determines the minimum time between laser pulses in sequentially activated laser systems. For example, an objected located one meter away from the lidar device will return a reflected signal in approximately 6.7 ns, while an object 80 meters away returns a reflected signal in approximately 533 ns. Assuming a system like system 100, the five semiconductor lasers can be cycled through in approximately 2.7 μs, while interrogating out to distances up to 80 meters. Note that these numbers merely illustrate the relative speed at which multiple different lasers can be used to interrogate different angular sections of the lidar system's field of view, and still perform the necessary work in a timely manner. For comparison, an automobile traveling at 60 mph moves less than a millimeter in 3 μs. As will be seen below, various other factors can effect the time allowable between successive laser pulses, such as photodetector speed, the time needed to activate a laser, pulse duration, signal processing, and potentially the number of obstacles encountered (e.g., reflections from different ranges) as the result of any one laser pulse.

Time of flight analysis will typically be based on a reflection window that corresponds to the desired maximum interrogation distance. Detected signals arriving at different times within that window will correspond to objects at different distances, and signal processing software and/or circuitry is used to analyze photodetector signals to distinguish various different objects and distances along a particular scan path. In still other embodiments in accordance with the invention, relatively narrow time windows can be used to examine specific distance ranges. For example, instead of examining all photodetector signals between the time of laser pulse transmission and 600 ns later, photodetector signals from a particular time range (e.g., 550-600 ns) can be examined. In this way, the lidar device is used to probe a particular distance range. In addition to cycling through different angular directions by cycling through each of the lasers in a laser array, different depths can be sequentially examined by examining different reflection windows for each pulse. Thus, instead of simply scanning through various different angles, a raster-like scan can be performed through different angles and different depths. Defining different interrogation windows can also be useful to implement both short range and long range scans in the same system.

While the system 100 of FIG. 1 illustrates only five semiconductor lasers, a typical system will have enough lasers to cover the desired field of view and provide the desired angular resolution. Numerous different device features can be adjusted to accommodate different applications and lidar system requirements including: semiconductor laser beam shape properties, lens properties, the number of lasers used, and the like. In one example in accordance with the invention, the minimum angular resolution of the lidar system is 0.5 degrees. This is based on a desire to be able to resolve a pedestrian (approximately 260 mm wide at their narrowest dimension, e.g., walking perpendicular to the direction of travel of the vehicle with the lidar system) at 30 m (a distance sufficient to provide the vehicle operator time to react). Consequently, a laser array supporting a 30 degree field of view would need at least 60 lasers to provide the desired angular resolution. Of course, numerous other implementations can be constructed. Some can have finer angular resolution, courser angular resolution, varying angular resolution, smaller or larger fields of view, and the like.

Although any type of semiconductor laser can generally be used to implement lasers 120 and laser array 110, vertical cavity surface-emitting lasers (VCSELs) are particularly useful for the disclosed lidar applications because they have a small angular divergence and emit light normal to the surface of the wafer in which they are fabricated. In the case of edge emitting semiconductor lasers, a number of layers of material are deposited onto a substrate, which is then cleaved to form partially transmissive mirrors. One or more of the deposited layers forms an optical cavity, bound at its edges by the cleaved mirrors. Lasing occurs within the cavity between the mirrors, and the laser beam exits at one or both of the edges of the laser structure in a direction parallel to the plane of the layers. VCSELs differ in that the laser beam is emitted orthogonal to the plane of the active layer(s). Mirrors are formed above and below the optical cavity, instead of at each edge of the cavity. In addition, since VCSELs incorporate the mirrors monolithically in their design, they allow for fabrication of integrated one-dimensional or two-dimensional laser arrays with close device spacing (e.g., 250 µm or closer). In contrast, edge emitting lasers typically must be mechanically jointed to form such arrays. Also, surface emitting lasers typically emit circularly symmetric Gaussian beams, as compared to highly eccentric elliptical beams of edge emitting lasers. Moreover, because individual VCSELs can be fabricated with relatively small active areas, they can be activated quickly, e.g., on the order of picoseconds. VCSELs can also be fabricated to emit light at various different wavelengths. For example, VCSELs with emission wavelengths in the approximately 1-1.5 µm range are useful for lidar implementations because various wavelengths in that range have certain atmospheric transmission advantages, e.g., low absorption.

The inherently integrated nature of VCSEL arrays provides additional opportunities to integrate optics such as lens 130 into a single device/package, and otherwise enhances the ability to align and mount optics to the laser array. This allows for simpler lidar device manufacturing and reduction in overall device complexity and cost. Moreover, specialized VSCEL arrays, for example, with various different 1D and 2D arrays configurations (e.g., where the semiconductor lasers are arranged along a curve, irregularly spaced, etc) are easier to fabricate then similar devices composed of separate edge-emitting laser devices. Laser arrays can also be designed with redundant semiconductor lasers so that failure of a single device need not render the entire array unusable. It should be noted that system 100 is merely one example of the many laser array lidar scanners in accordance with the invention, and numerous different array configurations, lens designs, lens configurations, and other optical elements (filters, anti-reflection coatings, apertures, etc.) can be used as part of system 100 as is well known to those skilled in the art.

Figure 2:
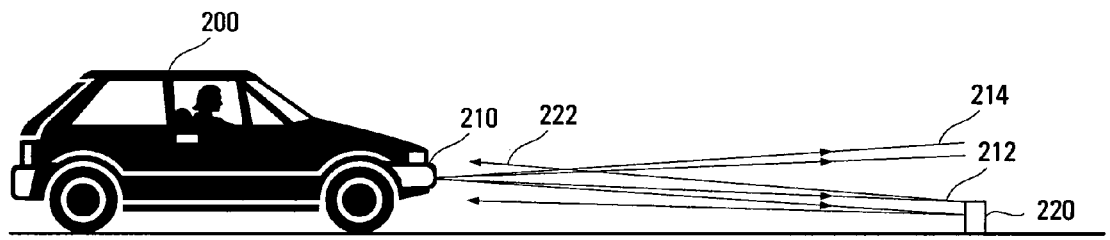
FIG. 2 illustrates in-vehicle implementation of one or more laser array based lidar systems in accordance with the invention.

FIG. 2 illustrates in-vehicle implementation of one or more laser array based lidar systems in accordance with the invention. In this example in accordance with the invention, vehicle 200 has at least one lidar system 210 located in the front of the vehicle, e.g., built into the vehicle's bumper. Two scan patterns are shown originating from vehicle 200: scan pattern 212 which reflects off of object 220 to produce reflected beam 222, and scan pattern 214. Scan patterns 212 and 214 represent laser scans in two different planes. Thus, each of scan patterns 212 and 214 illustrate a complete scan plane such as that shown in FIG. 1, i.e., FIG. 2 shows the scan pattern in cross section. Scan patterns 212 and 214 can be produced by a single 2D laser array, a single 1D laser array, or multiple 1D laser arrays. For example, a single 1D laser array can include an additional grating, mirror, spatial modulator, or phase modulator to deflect or steer some or all of the light from a laser in the 1D laser array in a direction in the plane of FIG. 2, i.e., a direction generally orthogonal to the direction of scanning. In this way, multiple scan patterns/planes can be implemented. Thus, a single lidar system can be designed to accommodate multiple scan planes, or the different scan patterns can be produced by separate lidar systems.

Although not explicitly illustrated in FIG. 2, scan patterns 212 and 214 (and their associated laser array(s) and lidar system(s), can also be configured to interrogate different fields of view, i.e., fields of view including vectors at least partially into or out of the plane of the figure. For example, one lidar system can be placed on the front, right of vehicle 200 with its field of view centered 15 degrees to the left of the vector defining the direction of the vehicles movement. Similarly, another lidar system can be placed on the front, left of vehicle 200 with its field of view centered 15 degrees to the right of the vector defining the direction of the vehicles movement. The two separate lidar systems will sweep out different (possibly overlapping) fields of view, depending in part on the angular extend of each scan pattern. In this manner wider scan areas can be accommodated, or specialized scans can be performed, e.g., short distance scans on one side of the vehicle, long distance scans on the other side of the vehicle. Numerous variations in the location and configuration of the presently described lidar systems will be well known to those skilled in the art. Multiple different scan planes (e.g., beyond the two illustrated) can be searched using one or more lidar devices. Different areas in any direction around the vehicle can also be scanned. Lidar systems can also be located in any position in the vehicle (e.g., height, lateral location, etc.) that is desired.

Figure 3:
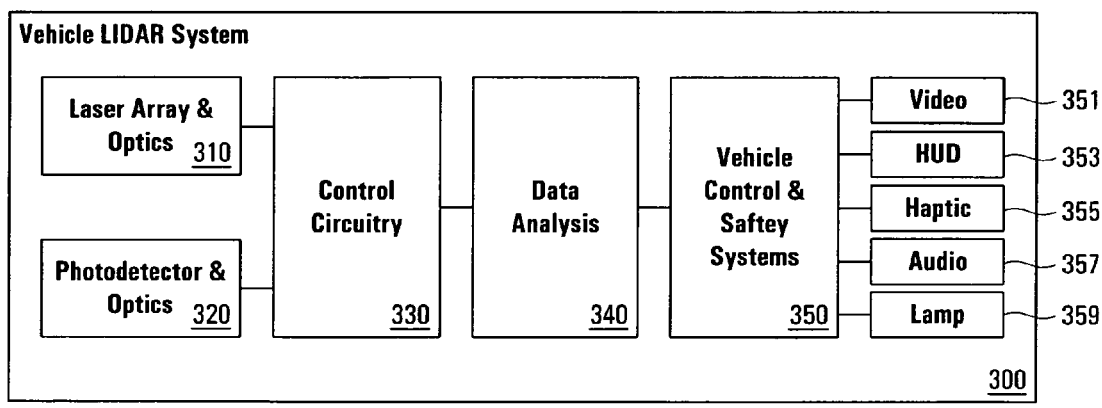
FIG. 3 illustrates a block diagram of some of the components of a vehicle lidar system in accordance with the invention.

FIG. 3 illustrates a block diagram of some of the components of a vehicle lidar system in accordance with the invention. Vehicle lidar system 300 includes lidar sensor components such as laser array and associated optics 310 and photodetector and associated optics 320. Control circuitry 330 provides needed sensor component control such as activating individual lasers in a laser array, laser modulation and encoding, timing functions, photodetector signal amplification, and the like. Additionally, if the sensor components include other devices that need to be controlled, e.g., the transducers described below in connection with FIGS. 5A-6B or beam deflection devices described above, control circuitry 330 can provide desired support functionality. Once data is acquired from the sensor components, it is passed (either via control circuitry 330 as shown, or directly) to data analysis module 340. Data analysis module 340 performs various types of photodetector signal decoding and signal processing to derive useful information about one or more objects detected in the field of view of the lidar system. That information is passed to vehicle control and safety systems 350, which uses the information in automatic or semi-automatic safety systems (e.g., automatic emergency braking, headlight control, horn control, ACC, etc.) and/or provides information to the vehicle operator via one or more human interfaces (351-359). Vehicle control and safety systems 350 can also provide a user, such as a vehicle operator or programmer, with control over one or more lidar system parameters. Such parameters can include, for example: scan type, scan resolution, scan area, scan depth, warning indicator type, etc.

Five different human interfaces are illustrated: video display 351, heads-up display (HUD) 353, haptic interface 355, audio interface 357, and indicator lamp 359. Nevertheless, numerous different types of warning devices, indicators, and user interface elements can be used in conjunction with the lidar systems in accordance with the invention.

Video display 351, HUD 353, and indicator lamp 359 are all examples of various types of visual indicators that can be used to alert a vehicle operator about objects identified by the lidar system. For example, video display 351 could provide graphical indicators of the presence of objects generally (e.g., a warning message), schematic displays of the presence of objects relative to the vehicle's position, or more detailed displays of live video of the vehicle environment with highlighted object details. Such displays are typically presented via in-dash or separately mounted computer displays. Similarly, HUD 353 can provide the same types of visual information or more simple warning indications, only this information is projected onto the vehicle windshield so that it is in the line of sight of the vehicle operator. Moreover, HUD systems can provide information in context, e.g., indicators or shaded areas projected on portions of the windshield through which an operator would see the identified object. Indicator lamp 359 is perhaps the simplest type of visual indicator, e.g., one or more lights (LEDs, lamps, etc.) that flash or are activated when an object is detected by the lidar. In other examples in accordance with the invention, a series of lights might be progressively illuminated or change color as proximity to or the perceived danger associated with the object increases.

Haptic interface 355 provides some manner of force feedback to the vehicle operator. Haptics refers to the sense of touch, as optics does to the sense of sight. Haptics can be broken into three conceptual areas: force feedback, tactile feedback, and proprioception. With force feedback, a user feels forces supplied by a haptic interface. Most force feedback devices are mechanical and present forces to a user through motors. Tactile feedback refers more to the sense of touch across the skin through mechanoreceptors to present a user with different skin sensations, and/or subtle and sometimes rapid variation in force feedback to simulate tactile feedback. Proprioception is our ability to sense where our body is located in space through internal musculoskeletal forces. In the context of vehicle based lidar systems, typical haptic interfaces will include seat-based vibration devices and steering wheel devices to provide vehicle operator's with direct indicators of detected objects.

Audio interface 357 can be implemented in a variety of forms. In the simplest examples, a distinctive warning sound will be presented to the vehicle operator. Such systems can be integrated with onboard audio systems (e.g., stereo systems and cellular telephone systems) to interrupt other audio so that the warning can be more clearly heard. More sophisticated warning sounds can include progressive tones, e.g., sounds that vary in volume, pitch, etc, based on the severity of the situation, and digitized voice indicators explicitly notifying the operator about the type and/or severity of the situation.

Figure 4A:
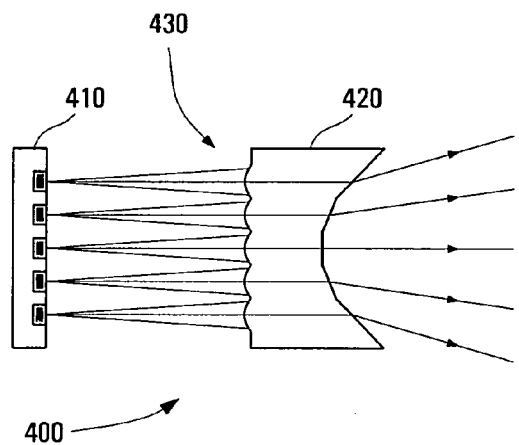
FIGS. 4A-4B illustrate additional examples of laser and optics systems in accordance with the invention for use in lidar systems and particularly vehicle based lidar systems.
Figure 4B:
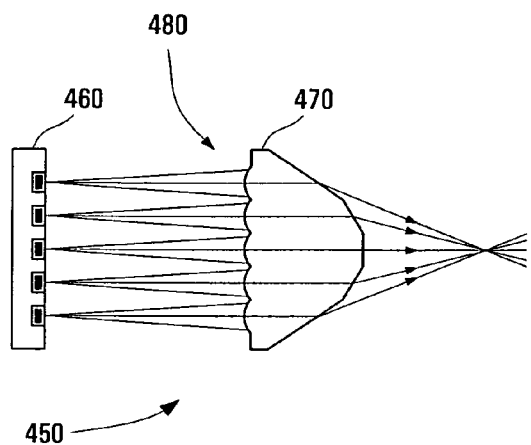

FIGS. 4A-4B illustrate additional examples of laser and optics systems in accordance with the invention for use in lidar systems and particularly vehicle based lidar systems. More specifically, FIGS. 4A-4B illustrate different types of optics that can be used in conjunction with laser arrays to provide laser scanning in various different directions.

Laser and optics system 400 includes laser array 410 and optical element 420. In general, optical element 420 can comprise one or more elements such as prisms, prism arrays, beam steering elements, lens arrays, beam collimating elements, and the like. As shown in this example, optical element 420 is a specialized prism. Optical element 420 is formed from a suitable optical material (e.g., optical quality plastics, glasses, III-V materials, or other materials sufficiently transparent to the light emitted by laser array 410) and includes an integrated collimating lens array 430. The lenses of collimating lens array 430 are designed and located to work in conjunction with each of the lasers in laser array 410. Light from each laser is collimated by the corresponding lens array element and is steered using the rest of the optical element. In this example, optical element 420 includes various facets generally forming a concave but irregular surface. When light from a particular lens array element emerges from the corresponding optical element facet, it is refracted in a direction according to Snell's law. Since the light from each laser is steered by optical element 420 with a different angle, the result is a number of beams equal to the number of laser sources, each with a different angle. Selecting a different laser from the laser array effectively selects the angle at which the interrogating beam emanates from the system.

Laser and optics system 450 is another example of a refractive element, and includes laser array 460 and optical element 470. Optical element 470 is formed from a suitable optical material and includes an integrated collimating lens array 480. The lenses of collimating lens array 480 are designed and located work in conjunction with each of the lasers in laser array 460. Light from each laser is collimated by the corresponding lens array element and is steered using the rest of the optical element. In this example, optical element 470 includes various facets generally forming a convex but irregular surface. When light from a particular lens array element emerges from the corresponding optical element facet, it is refracted in a direction according to Snell's law.

Note that in the systems of FIGS. 4A and 4B, the lens arrays can be separate optical elements used in conjunction with the remainder of the corresponding optical element. Numerous other refractive elements can be used to achieve the desired beam steering as will be well known to those skilled in the art. Moreover, some implementations in accordance with the invention will integrate the optics with laser array 410 or 460. Numerous different techniques such as machine grinding, injection molding, stamping, and semiconductor fabrication techniques can be used to fabricate the refractive elements. Other diffractive devices such as specially formed holographic optical elements, modulators, and liquid crystal devices can similarly be employed for beam steering.

FIGS. 5A-6B illustrate various examples of laser and optics systems in accordance with the invention for use in lidar systems and particularly vehicle based lidar systems. More specifically, each of the figures demonstrates laser and optics systems that utilize a smaller number of semiconductor lasers to achieve the same angular scanning coverage as a larger number of semiconductor lasers.

Figure 5A:
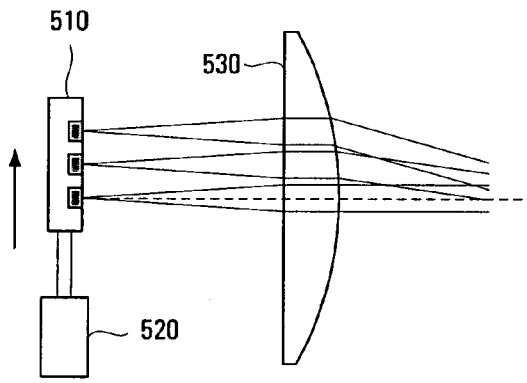

For example, in FIG. 5A, laser array 510 includes only three semiconductor lasers as opposed to the five lasers illustrated in previous examples. To compensate for the reduced number of lasers in laser array 510, laser array 510 can be translated with respect to lens 530. As shown in FIG. 5A, laser array 510 has been translated to its maximum displacement with respect to the centerline of lens 530. To accomplish laser array translation, laser array 510 is coupled to linear translator 520. Translator 520 can be implemented using numerous different devices such as voice coils, piezoelectric translators, stepper motors, shape memory translators, vibrator motors, and various other motors and devices. In general, only a small amount of translation (e.g., on the order of millimeters or less) is needed to significantly reduce the number of individual lasers needed for a particular laser array. In some embodiments in accordance with the invention, it is desirable to be able to effect translation fairly rapidly, and such implementation details may suggest the use of certain types of translators. As shown in FIG. 5B, translator 520 has positioned laser array 510 at the other extreme of its travel with respect to the centerline of lens 530. In this simple example, the number of individual lasers has been reduced by 40%, while the same angular field of view is maintained.

Figure 6A:
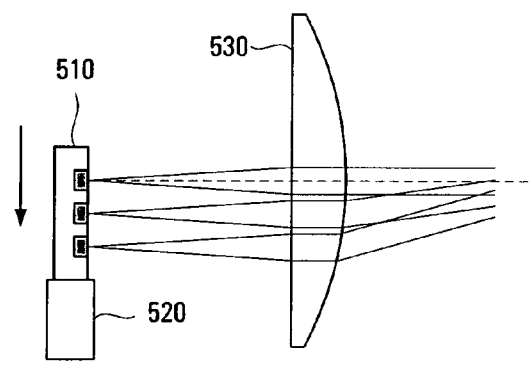
FIGS. 6A-6B illustrate still other examples of laser and optics systems in accordance with the invention for use in lidar systems and particularly vehicle based lidar systems.
Figure 6A:
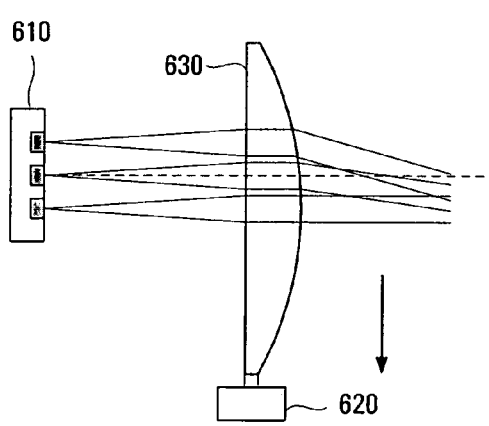
Figure 6B:
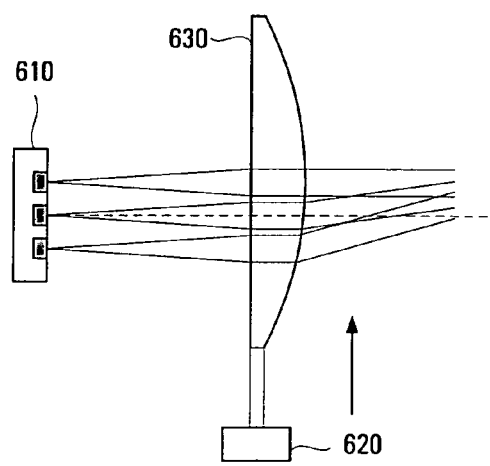

FIGS. 6A and 6B illustrated a similar system. Here laser array 610 is stationary, but still includes only three semiconductor lasers as opposed to the five lasers illustrated in previous examples. To compensate for the reduced number of lasers in laser array 610, lens 630 can be translated with respect to laser array 610. As shown in FIG. 6A, laser array 510 has been translated to one extreme displacement with respect to the centerline of laser array 610. To accomplish lens translation, laser lens 630 is coupled to linear translator 620. Translator 620 can be implemented using numerous different devices such as those described above in connection with translator 520. Again, only a small amount of translation is typically needed to significantly reduce the number of individual lasers needed for a particular laser array. FIG. 6B, shows lens 630 positioned at the other extreme of its travel with respect to the centerline of laser array 610.

In principle, an array having a single laser can be used and appropriately translated with respect to a lens, or the lens translated with respect to the laser array. Additionally, translation schemes such as those illustrated can be used to provide redundancy among individual lasers. For example, and array of multiple lasers can be provided, but only one or a small number are initially used for scanning. Should one or more of these devices fail, a different single or set of lasers can then be used, where lasers are selected so as to avoid the failed devices.

FIGS. 7A-7D illustrate examples of photodetection systems for use with various lidar systems and particularly vehicle based lidar systems. Detection systems must contend with various factors limiting their ability to collect light reflected from an object such as: beam expansion, atmospheric losses (absorption and scattering), poor object reflectivity, losses associated with light collection optics, detector efficiency, light obscuring material collecting on system optics. Additionally, lidar systems for vehicles often have certain size/weight constraints that can limit the size of photodetector used or the type of photodetector used. As will be well known to those skilled in the art, numerous different types of photodetectors can be used in lidar systems in accordance with the invention. Chief among them are various photodiodes such as PIN photodiodes, PN photodiodes, and avalanche photodiodes. The photodiodes can also vary based on device material, e.g., Si, GaAs, InGaAs, HgCdTe, etc. Still other types of photodetectors can be used such as CCD devices, CMOS based detectors, and photomultiplier tubes. Depending on photodetector sensitivity, various filters, masks and antireflection coatings can also be used in conjunction with the photodetectors.

Figure 7A:
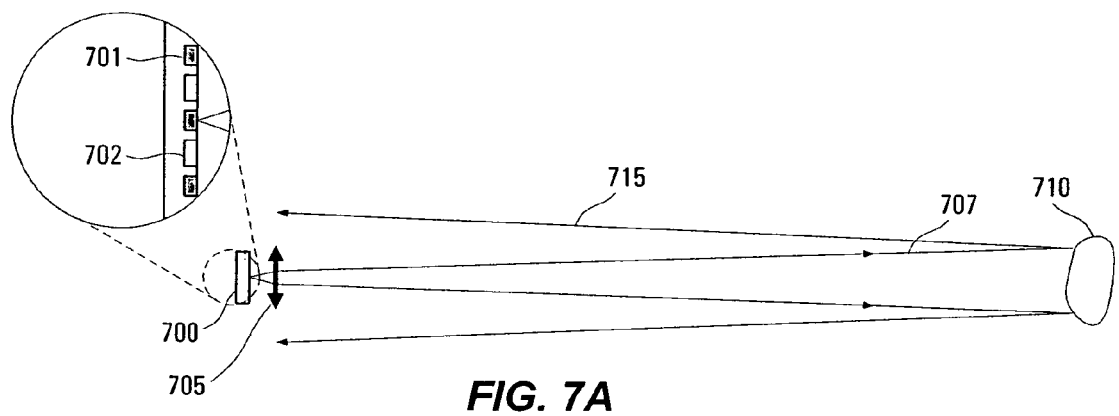
FIGS. 7A-7D illustrate examples of photodetection systems for use with various lidar systems and particularly vehicle based lidar systems, and in accordance with the invention.

In the system of FIG. 7A, one or more photodetector devices 702 are integrated with semiconductor lasers 701 of laser array 700. Thus, photodetectors 702 can be fabricated along with lasers 701, e.g., part of the same semiconductor die, or can be integrated with the various lasers into a single composite device. Although photodetectors 702 are shown interspersed with lasers 701 in the laser array, this need not be the case. For example, one or more photodetectors can be located in proximity to the laser array, and arranged in any suitable geometry. As shown in FIG. 7A, laser array 700 transmits a beam 707 through lens 705, and beam 707 is subsequently reflected (715) by object 710. Lens 705 is selected to allow both proper transmission of beam 707, and adequate collection of light from reflected beam 715.

Figure 7B:
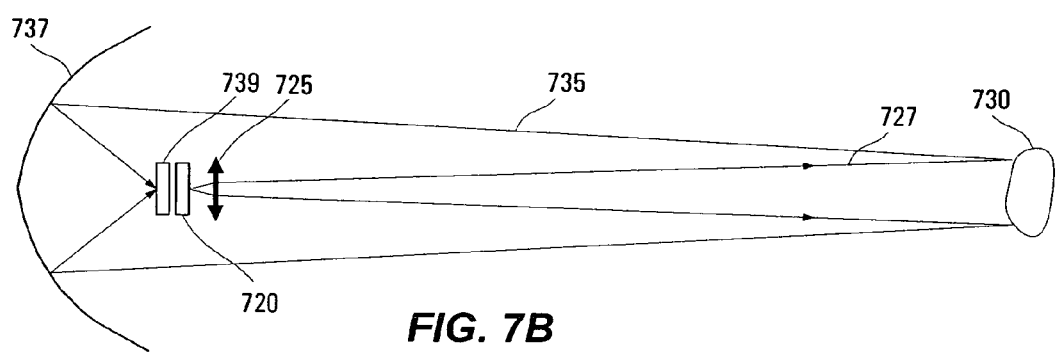

FIG. 7B illustrates another reflected light detection scheme in accordance with the invention. In this example, laser array 720 transmits a beam 727 through lens 725, and beam 727 is subsequently reflected (735) by object 730. Reflected light 735 is collected by mirror 737 and reflected back to photodetector 739. In this case, mirror 737 is a parabolic reflector with its focus located to coincide with the active area of photodetector 739. Other types of concave reflectors, e.g., elliptical, spherical, etc., can also be used. Mirror 737 is particularly effective at gathering reflected light from an expanded reflected beam and concentrating that light in a manner that assists detection.

Figure 7C:
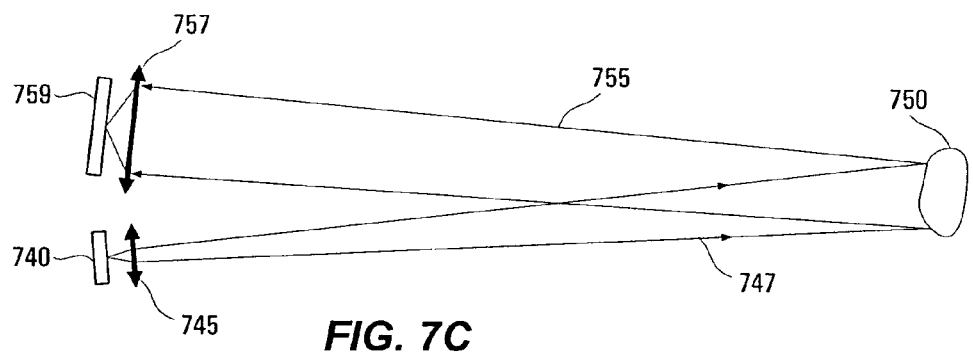

FIG. 7C illustrates still another reflected light detection scheme in accordance with the invention. In this example, laser array 740 transmits a beam 747 through lens 745, and beam 747 is subsequently reflected (755) by object 750. Reflected light 755 is collected by lens 757 and focused onto photodetector 759. In this example, photodetector 759 is located off-axis with respect to laser array 740, but generally provides a relatively large detector area in order to increase signal collection. Photodetector 759 is typically located in proximity to laser array 740, but that need not be the case. In general, photodetector 759 can be located any place where sufficient reflected light 755 can be collected. Thus, depending on the size and location of photodetector 759, some implementations may use a simple optical flat or window (perhaps with a suitable antireflection coating) in place of lens 757. In still other implementations, more sophisticated collection optics can be used.

Figure 7D:
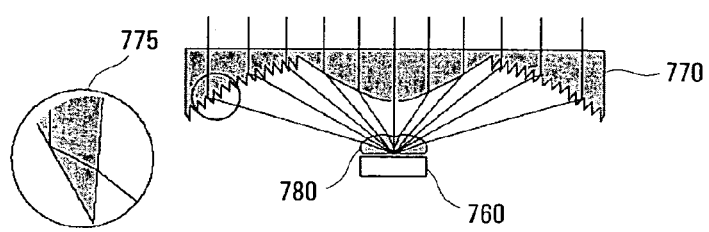

FIG. 7D illustrates an example of the type of collector optics that can be used in conjunction with many of the photodetector systems described. The primary component of the concentrator is a transmission, total internal reflection, refraction (TIR) lens 770 that utilizes a short focal length while maximizing angular acceptance. Light enters the top surface generally normal to the surface, and internally reflected and transmitted as shown in inset 775. Thus, the outer portions of lens 770 are similar to Fresnel lenses. The central portion of lens 770 is typically aspheric. Using the aspheric lens in the central portion and the TIR groves on the periphery allows for generally compact design. An optional secondary lens 780 can be used to further concentrate light for photodetector 760.

Those skilled in the art will readily recognize that a variety of different types of optical components and materials can be used in place of the components and materials discussed above. For example, various cylindrical, spherical, aspheric, reflective and refractive optical components can be used. Moreover, various types of optical modulators such as electro-optic modulators, acousto-optic modulators, spatial light modulators, phase modulators, and the like can also be used to provide beam steering functionality. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus for a vehicle lidar system comprising:
   a plurality of semiconductor lasers;
   an optical element mounted with respect to the plurality of lasers so that at least two of the plurality of lasers produce beams that emanate from the optical element in substantially different directions;
   control circuitry coupled to the plurality of semiconductor lasers and configured to sequentially and separately activate the at least two of the plurality of lasers;
   a translator coupled to the plurality of semiconductor lasers, the translator configured to translate the plurality of semiconductor lasers with respect to the optical element.

2. The apparatus of claim 1 wherein the plurality of semiconductor lasers further comprises at least one of:
   a plurality of vertical cavity surface-emitting lasers (VCSELs) formed on a single semiconductor substrate; a plurality of VCSELs, wherein at least two of the plurality of VCSELs are formed on different semiconductor substrates; and a plurality of edge emitting lasers.

3. The apparatus of claim 1 wherein the plurality of semiconductor lasers is arranged in a two-dimensional linear array.

4. The apparatus of claim 1 wherein a first one of the plurality of semiconductor lasers produces light having a first wavelength, and a second one of the plurality of semiconductor lasers produces light having a second wavelength.

5. The apparatus of claim 1 wherein the optical element further comprises at least one of a lens, a prism, and a lens array.

6. The apparatus of claim 1 wherein the translator further comprises at least one of a voice coil, a piezoelectric translator, a stepper motor, a shape memory translator, and a vibrator motor.

7. The apparatus of claim 1 further comprising a photodetector configured to detect light generated by at least one of the plurality of semiconductor lasers and reflected from an object scanned by the lidar system.

8. The apparatus of claim 7 further comprising: a light collection optical element mounted with respect to the photodetector and operable to concentrate at least a portion the light generated by the at least one of the plurality of semiconductor lasers and reflected from the object scanned by the lidar system, wherein the light collection optical element further comprises at least one of a reflective optical element, a refractive optical element, a holographic optical element, and a diffractive optical element.

9. The apparatus of claim 7 wherein the photodetector is formed on the same semiconductor substrate as the plurality of semiconductor lasers.

10. The apparatus of claim 7 wherein the photodetector further comprises at least one of: a PIN photodiode, a PN photodiode, an avalanche photodiode, a CCD device, a CMOS detector, and a photomultiplier tube.

11. The apparatus of claim 7 further comprising: a signal processing circuit for determining an approximate distance between the vehicle and an object reflecting at least one of the respective beams produced by the at least two of the plurality of lasers, wherein the signal processing circuit uses information provided by the photodetector.

12. The apparatus of claim 11 further comprising: a vehicle safety system coupled to the signal processing circuit, wherein the vehicle safety system further comprises an indicator configured to provide information, to a vehicle user, related to the object reflecting at least one of the respective beams produced by the at least two of the plurality of lasers, and wherein the indicator further comprises at least one of: a video display, a heads-up display (HUD), a haptic interface, an audio interface, and an indicator lamp.

13. A method of detecting objects in a vehicle's environment, the method comprising:
activating a first semiconductor laser to produce a first beam;
deflecting the first beam in a first direction using a first optical element;
activating a second semiconductor laser to produce a second beam;
deflecting the second beam in a second direction using the first optical element;
translating said second semiconductor laser relative to said first optical element;
detecting light from at least one of the first beam and the second beam reflected by an object in the vehicle's environment; and
determining a location of the object in response to the detecting.

14. The method of claim 13 wherein the first semiconductor laser and the second semiconductor laser are together at least one of:
a plurality of vertical cavity surface-emitting lasers (VCSELs) formed on a single semiconductor substrate;
a plurality of VCSELs, wherein at least two of the plurality of VCSELs are formed on different semiconductor substrates;
a plurality of edge emitting lasers;
a portion of a one-dimensional linear laser array; and
a portion of a two-dimensional linear laser array.

15. The method of claim 13 wherein at least one of the deflecting the first beam further comprises transmitting the first beam through a refractive optical element.

16. The method of claim 13 further comprising: collecting the light from at least one of the first beam and the second beam reflected by an object in the vehicle's environment using at least one of a reflective optical element, a refractive optical element, and a diffractive optical element; and focusing at least a portion of the collected light on a photodetector.

17. The method of claim 13 further comprising: providing an object detection indication to a vehicle user.

18. An apparatus for detecting objects in a vehicle's environment, the apparatus comprising:
a means for producing a first laser beam;
a means for producing a second laser beam;
a means for sequentially activating the means for producing a first laser beam and the means for producing a second laser beam;
an optical element for deflecting the first laser beam in a first direction and the second laser beam in the second direction;
a means for translating said first laser beam relative to said optical element;
a means for detecting light from at least one of the first laser beam and the second laser beam reflected by an object in the vehicle's environment; and
a means for determining a location of the object using information from the means for detecting light.

* * * * *

UNITED STATES PATENT AND TRADEMARK OFFICE
CERTIFICATE OF CORRECTION

PATENT NO. : 7,544,945 B2  Page 1 of 1
APPLICATION NO. : 11/347954
DATED : June 9, 2009
INVENTOR(S) : Michael R. T. Tan et al.

It is certified that error appears in the above-identified patent and that said Letters Patent is hereby corrected as shown below:

Column 11, Line 14, Claim 8, after "portion" insert --of--.

Signed and Sealed this
Second Day of October, 2012

David J. Kappos
*Director of the United States Patent and Trademark Office*